United States Patent

[11] 3,617,870

| [72] | Inventor | Peter A. Howes<br>La Verne, Calif. |
|---|---|---|
| [21] | Appl. No. | 846,822 |
| [22] | Filed | Aug. 1, 1969 |
| [45] | Patented | Nov. 2, 1971 |
| [73] | Assignee | Bell & Howell Company<br>Chicago, Ill. |

[54] AUTOMOBILE CONNECTOR APPARATUS FOR USE WITH AN ELECTRONIC ANALYZER
9 Claims, 1 Drawing Fig.

[52] U.S. Cl. ................................. 324/15, 324/73
[51] Int. Cl. ................................. G01m 15/00
[50] Field of Search ................................. 324/15–18, 73, 126, 127, 158 MG; 73/116–118

[56] References Cited
UNITED STATES PATENTS
1,446,995   2/1923   Sines ........................... 324/126

2,181,149   2/1939   Peters ........................... 324/16
2,780,777   2/1957   Sammins ....................... 324/73
3,409,824   11/1968  Makuh .......................... 324/15
FOREIGN PATENTS
1,439,258   4/1966   France .......................... 73/116
OTHER REFERENCES
A. Hannavy–Machines Take On Diagnosis of Auto Engine Performance–Product Engineering–4/10/1967–pp. 28– 30.

Primary Examiner—Michael J. Lynch
Attorney—David Weiss

ABSTRACT: Connector and sensor apparatus permanently installed at probe pickup locations in an automobile's electrical system, for connection to an electronic analyzer. A current probe included by the apparatus involves the determination of a length of a battery ground cable relating voltage difference across the determined length to current passing through the cable in a calibrated manner, and connecting the determined length to the analyzer for measuring voltage difference thereacross.

PATENTED NOV 2 1971
3,617,870
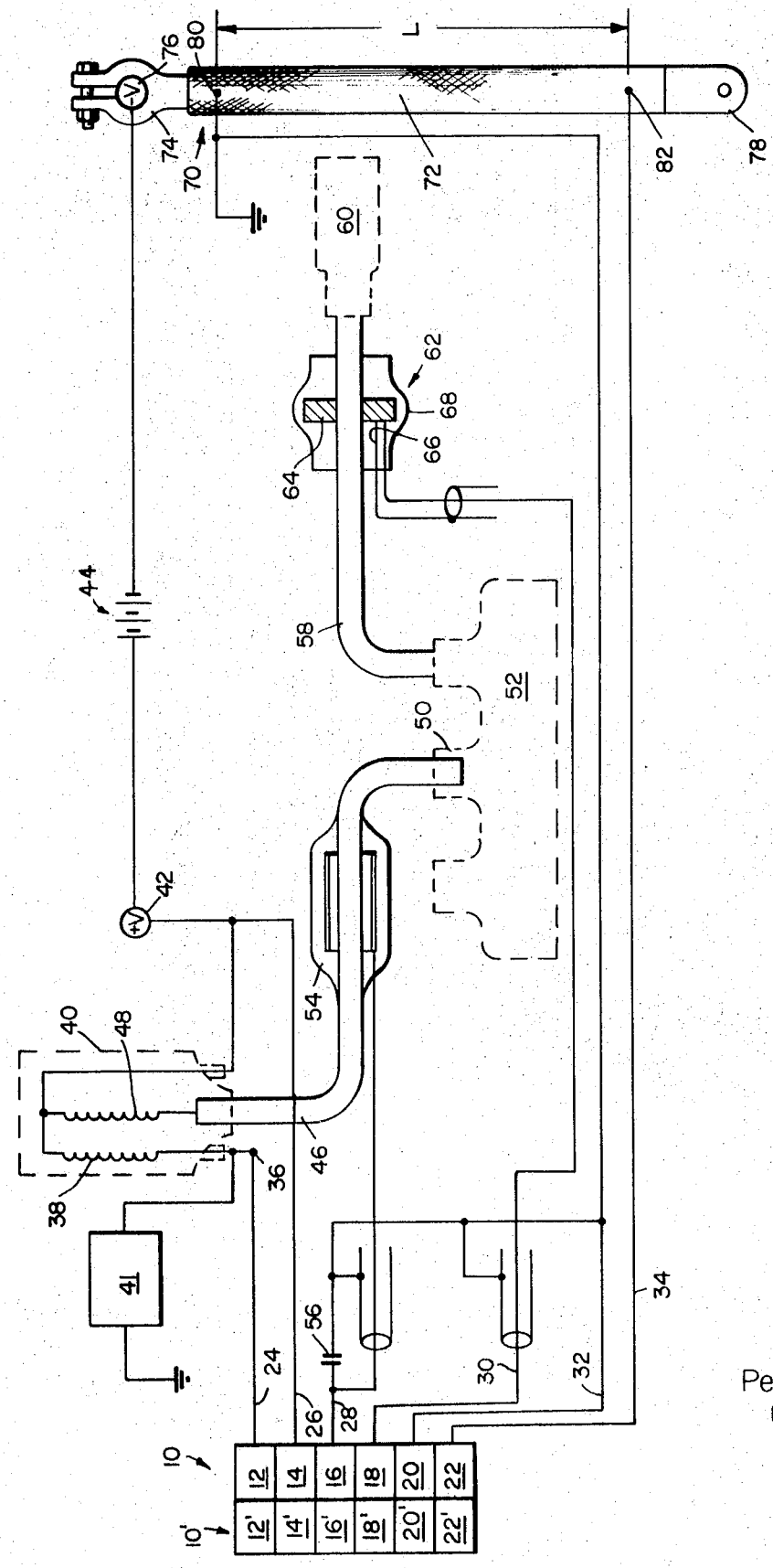
Peter A. Howes,
INVENTOR.
BY
David Weis
ATTORNEY.

AUTOMOBILE CONNECTOR APPARATUS FOR USE WITH AN ELECTRONIC ANALYZER

BACKGROUND OF THE INVENTION

1. Field of the Invention

This invention relates to electronic analyzers for internal combustion engines, and more particularly to apparatus permanently installable in an automobile for connecting an analyzer to the electrical system of the automobile without affecting engine performance.

2. Description of the Prior Art

In testing the ignition characteristics of an internal combustion engine by electronic analyzer apparatus, various connector means are required between the analyzer and specific locations in the engine's electrical system. Sensing means are further required to be coupled into the engine's electrical system at other specific locations and connected to the analyzer.

Such connector and sensor means, often referred to as pickup probes, have previously been temporarily coupled to the engine's electrical system for the duration of testing. This procedure, which involves the temporary installation of devices at locations of difficult accessibility, is time consuming as well as often resulting in the several probes being incorrectly installed. More importantly, the temporary introduction of the pickup probes into the ignition system can disturb certain of the necessary connections which are a part of the electrical system, so that the ensuing analysis does not truly represent characteristics of the engine under normal conditions.

In particular, one of the probes required for ignition analysis senses the electrical current on starting the engine, which can permit the monitoring of the compression in the engine's cylinders, since the starter load is dependent upon the cranking torque required for a cylinder. Various types of current probes have been designed, some requiring the series insertion of sensors into the electrical circuit, and others employing saturable reactor sensors or magnetic field measuring devices which are clamped about the main battery cable.

SUMMARY OF THE INVENTION

The present invention comprises pickup probe and connector apparatus which is permanently installable into an engine's electrical system and to which an electronic analyzer can be easily and quickly connected and disconnected. After initial installation, the engine's electrical system is not disturbed in preparation of diagnostic analysis of engine characteristics, so that the system's normal operating conditions are not changed predetermined testing.

A feature of the present invention is the provision of a simple, economical and efficient method and apparatus for determining the starting current, as well as for measuring charging current to the battery. Current measurements are made by utilizing a predetermined length of one of the engine's battery cable as a shunt, in accordance with a method for modifying the battery cable for this purpose. A pair of conductive wires are connected across the predetermined length of cable, and the wires are connected to two terminals of a multiple-terminal connector permanently installed in the automobile and to which the electronic analyzer is connected by means of a mating connector. Other terminals of the multiple-terminal connector are electrically coupled to associated pickup probes which, like the current probe, are permanently installed at appropriate locations of the enginge's ignition system.

BRIEF DESCRIPTION OF THE DRAWING

The novel features which are believed to be characteristic of the invention will be better understood from the following description considered in connection with the accompanying drawing in which a preferred embodiment of the present invention is illustrated by way of example. It is expressly understood, however, that the drawing is for the purpose of illustration and description only and is not intended as a definition of the limits of the invention.

The drawing is a schematic representation of a preferred embodiment of the pickup probe and connector apparatus of the present invention, shown permanently installed at appropriate locations of an ignition system provided by an internal combustion engine.

DESCRIPTION OF THE PREFERRED EMBODIMENT

Turning to the drawing, an electrical connector such as a receptacle 10 is permanently installed at an easily accessible location in an automobile. The receptacle 10 includes a plurality of conductor terminals and, in a typical construction, includes six terminals 12, 14, 16, 18, 20, 22, each of which are electrically insulated from the others and which are adapted to be electrically connected to respective terminals 12', 14', 16', 18', 20', 22', of a corresponding connector 10' secured to the electronic analyzer and adapted for mating with the installed receptacle 10. One example of an electronic analyzer for testing ignition and other electrical characteristics of an internal combustion engine, suitable for utilization with the apparatus of the present invention, is described in copending application for patent, Ser. No. 792,382, by the present inventor and assigned to the present assignee.

Respective ones of the receptacle terminals 12–22 are conductively connected either directly to specific locations in the engine's electrical system or to appropriate sensor means permanently installed at other specific locations in the engine's electrical system, by means of insulated conductive wires 24, 26, 28, 30, 32, 34.

More particularly, a first conductive wire 24 connects a first receptacle terminal 12 to a primary pickup location 36, i.e. to one side of a primary winding 38 of a "soil" 40 provided by the engine's ignition system, which side is further connected to the system's condenser and "points" assembly 41 in conventional manner. The other side of the primary winding 38 is electrically coupled to a positive terminal 42 of the automobile's battery which is typically 12 volts DC also in conventional manner.

The battery's positive terminal 42 is connected to a second conductor terminal 14 of the installed receptacle 10 by means of a second conductive wire 26.

The ignition system conventionally includes a "high-tension" insulated conductive wire 46 connecting a secondary winding 48 of the "coil" 40 to the main arm 50 of the ignition system's distributor 52. Capacitve sensor means is permanently installed at a secondary pickup location, and includes a conductive sleeve 54 (e.g., manufactured of a nonmagnetic material such as brass or copper) surrounding a portion of the insulation about the high-tension wire 46 and in circuit with a capacitor 56. The conductive sleeve 54 and the capacitor 56 perform a voltage divider function, the sleeve 54 representing one plate of a simulated capacitor and the conductive wire 46 representing the simulated capacitor's second plate.

The length of the conductive sleeve 54 and the value of the capacitor 56 are interrelated for producing a predetermined capacitve attenuation of voltages present on the high-tension wire 46. For example, the length of the conductive sleeve 54 can be approximately 2 inches, and the capacitor 56 selected to produce a 1000:1±10 percent capacitive attenuation; conversely, the length of the conductive sleeve 54 can be adjusted with respect to a particular value of the capacitor 56, for producing the predetermined attenuation.

The conductive sleeve 54 and one side of the capacitor 56 are connected to a third conductor terminal 16 of the installed receptacle 10, by means of a shielded conductive wire 28. The other side of the capacitors 56 is grounded, for completing the sensor circuit.

The ignition system further conventionally includes an insulated "ignition" wire 58 electrically connecting the distributor 52 to a spark plug connector 60, the spark plug connector 60 in turn being connected to a spark plug for initiating ignitions the engine's No. 1 cylinder. Electromagnetic sensor means 62 permanently coupled to the ignition wire 58 is provided for monitoring changing current flow during firing of the No. 1 spark plug. Specifically, the electromagnetic sensor means 62 includes a magnetically permeable toroid 64 (such as a ferrite toroid), wound with conductive wire 66 in a conventional manner. One end of the wire 66 is connected to a fourth conductor terminal 18 of the installed receptacle 10 by means of a fourth conductive shielded wire 30, while the other end of the wound wire 66 is grounded. An insulating sleeve 68 can be provided about the toroid 64.

The automobile's electrical system is conventionally provided with a battery ground cable assembly 70, including an electrically conductive cable 72, a terminal connector 74 at one end of the cable 72 is electrical connection with a negative terminal 76 of the battery 44, and a frame connector 78 at the other end of the cable 72 ordinarily connected to the frame of the automobile. The large currents drawn by the engine's starting motor during starting, as well as current flowing to the battery during battery charging operations, are represented by current flowing through the battery ground cable 72 during these times. The current pickup probe utilized by the preferred embodiment of the present invention monitors the voltage difference presented across a predetermined length L of the ground cable 72, the voltage difference being calibrated with respect to the current flowing through the cable 72; i.e., with respect to the resistance of the length L.

For example, the predetermined length L can be adjusted to provide 2 millivolts±2 percent between first and second indicia 80, 82 separated from one another by the predetermined length L, when a current of 10 amperes is flowing through the cable 72.

A fifth conductive wire 32 is electrically connected to the cable 72 at one of the indicia (preferably the first indicia 80) which is utilized as ground reference potential. A sixth conductive wire 34 is connected between a sixth receptacle terminal 22 and the second indicia 82, and the voltage difference across the fifth and sixth terminal connectors 20, 22 is a calibrated representation of the current passed through the battery 44.

In the preferred embodiment, the fifth and sixth conductive wires 32, 34 are permanently connected to the respective indicia 80, 82, by any suitable connector means. Alternatively, the modified battery ground cable assembly 70 can be utilized as a current probe where permanent probe installation is not desired. In such cases, the conductive wires 32, 34 can be temporarily attached to the cable 72 at the indicia 80, 82 by suitable temporary connector means, such as conventional alligator clips. Furthermore, the determination of the shunt resistor can be performed at the time of analysis, although it is preferred that this determination be made prior to installation of the cable in the automobile. If desired, the main battery cable can be utilized as a current probe in similar fashion, provided a portion of the main cable is utilized which represents the entire current flow through the battery 44. The voltage difference across the predetermined length L of the main battery cable will represent the battery current, but means should be provided for differentially measuring this voltage.

Thus, there has been shown a preferred embodiment of permanently installed connector and sensor apparatus for rapid connection and disconnection to an electronic analyzer for testing ignition characteristics of an internal combustion engine. In addition, a simple and economical current probe has been described which utilizes a conventional battery ground cable in its construction. Other embodiments of the invention, and modifications of the preferred embodiment presented herein, can be developed without departing from the essential characteristics thereof.

Accordingly, the invention should be limited only by the scope of the claims listed below.

What is claimed is:

1. In combination with an electronic analyzer and an internal combustion engine of an automobile including an ignition coil having a primary winding and a secondary winding, a battery, a first battery cable electrically coupled between a first terminal of the battery and the ignition coil, a second battery cable electrically coupled between a second terminal of the battery and the frame of the automobile, and a plurality of spark plugs; apparatus comprising:
    a first multiple connector installed in the automobile and including a plurality of first conductor terminals;
    a second multiple connector including a plurality of second conductor terminals conductively coupled to the electronic analyzer and arranged for mating with said first terminals;
    first conductive means connecting the primary winding to a first one of said first conductor terminals;
    second conductive means connecting the battery first terminal to a second one of said first conductor terminals;
    first sensor means coupled to the secondary winding;
    third conductive means connecting said first sensor means to a third one of said first conductor terminals;
    second sensor means coupled to a one of the spark plugs;
    fourth conductive means connecting said first sensor means to a fourth one of said first conductor terminals;
    fifth conductive means connecting one of the battery cables at a first reference position to a fifth one of said first conductor terminals; and
    sixth conductive means connecting said one battery cable at a second reference position to a sixth one of said first conductor terminals.

2. The apparatus according to claim 1 wherein said first sensor means includes capacitive sensor means.

3. The apparatus according to claim 1 wherein said second sensor means includes electromagnetic sensor means.

4. The apparatus according to claim 19, the engine's electrical system including a distributor and an insulated conductive wire electrically connecting the secondary winding to the distributor, wherein said first sensor means includes capacitive divider circuit means comprising
    a conductive sleeve about the insulated conductive wire and electrically connected to said third conductive means, and
    a capacitor having a first plate connected to said third conductive means and a second plate connected to ground.

5. The apparatus according to claim 19, the engine's electrical system including a distributor and an insulated conductive wire for electrically coupling the distributor to said one spark plug, wherein said second sensor means includes electromagnetic circuit means comprising
    a magnetically permeable toroid about the insulated conductive wire, and
    an inductive winding about said toroid, said winding having a first end conductively coupled to said fourth conductive means and a second end connected to ground.

6. The apparatus according to claim 19 wherein said one of the battery cables is a battery ground cable.

7. The apparatus according to claim 19 wherein said second reference position is separated from said first reference position by a predetermined length of said one battery cable.

8. In combination with an electronic analyzer and an internal combustion engine of an automobile including an ignition coil having a primary winding and a secondary winding, a battery, means defining a first conductive path between a first terminal of the battery and the ignition coil, means defining a second conductive path between a second terminal of the battery and the frame of the automobile, and a plurality of spark plugs; apparatus comprising:
    a first multiple connector permanently installed in the automobile and including a plurality of terminals;
    a second multiple connector including a plurality of terminals conductively coupled to the electronic analyzer and arranged for mating with said terminals of said first multiple connector;

a plurality of pickup probes permanently installed in the engine's electrical system, said pickup probes coupling the primary winding, the secondary winding, the battery first terminal, one of the spark plugs and two locations along the path defined by one of said means to respective ones of said terminals of of said first multiple connector.

9. The apparatus according to claim 20 wherein a battery ground cable is included within said one of said conductive paths.

* * * * *

UNITED STATES PATENT OFFICE
CERTIFICATE OF CORRECTION

Patent No. 3,617,870     Dated November 2, 1971

Inventor(s) Peter A. Howes

It is certified that error appears in the above-identified patent and that said Letters Patent are hereby corrected as shown below:

Column 1, line 50, the word "predetermined" should read "during";
          line 56, the word "cable" should read "cables".
Column 2, line 35, the word "soil" should read "coil";
          line 71, the word "capacitors" should read "capacitor".
Column 3, line 1, after "ignitions" insert --in--;
          line 17, the word "is" should read "in".
Column 4, line 36, "claim 19" should read "claim 1";
          line 46, "claim 19" should read "claim 1";
          line 57, "claim 19" should read "claim 1";
          line 59, "claim 19" should read "claim 1".
Column 6, line 1, delete the word "of" in the third occurrence
          line 2, "claim 20" should read "claim 8".

Signed and sealed this 9th day of May 1972.

(SEAL)
Attest:

EDWARD M. FLETCHER, JR.
Attesting Officer

ROBERT GOTTSCHALK
Commissioner of Patents